United States Patent
Xi

(10) Patent No.: US 9,288,835 B2
(45) Date of Patent: *Mar. 15, 2016

(54) METHOD, USER TERMINAL AND NETWORK SIDE EQUIPMENT FOR IMPROVING NETWORK RESOURCE OCCUPANCY

(71) Applicant: HUAWEI TECHNOLOGIES CO., LTD., Shenzhen, Guangdong (CN)

(72) Inventor: Le Xi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,798

(22) Filed: Dec. 2, 2014

(65) Prior Publication Data

US 2015/0099556 A1 Apr. 9, 2015

Related U.S. Application Data

(63) Continuation of application No. 13/547,069, filed on Jul. 12, 2012, now Pat. No. 8,923,906, which is a continuation of application No. PCT/CN2011/070284, filed on Jan. 14, 2011.

(30) Foreign Application Priority Data

Jan. 14, 2010 (CN) .......................... 2010 1 0002267

(51) Int. Cl.
*H04B 7/00* (2006.01)
*H04W 76/06* (2009.01)
(Continued)

(52) U.S. Cl.
CPC ........ *H04W 76/068* (2013.01); *H04W 52/0212* (2013.01); *H04W 72/0446* (2013.01); *H04W 76/064* (2013.01); *H04W 76/066* (2013.01)

(58) Field of Classification Search
USPC ........... 455/422.1, 450–453, 456.2, 464, 509, 455/510; 370/395.41, 332; 375/E7.141
See application file for complete search history.

(56) References Cited

U.S. PATENT DOCUMENTS 6,748,247 B1 6/2004 Ramakrishnan et al.
7,590,403 B1 9/2009 House et al.
(Continued)

FOREIGN PATENT DOCUMENTS

CN 1842024 A 10/2006
CN 101015196 8/2007
(Continued)

OTHER PUBLICATIONS

Japanese Office Action dated Mar. 18, 2014 in corresponding Japanese Application No. 2012-548330.
(Continued)

*Primary Examiner* — Dominic E Rego
(74) *Attorney, Agent, or Firm* — Staas & Halsey LLP

(57) ABSTRACT

A method, a user terminal and a network side equipment for improving network resource occupation are disclosed. A dormancy timer is set for the user terminal and a time threshold of the dormancy timer is adjusted dynamically by monitoring a resource occupation rate of the communication system, where time threshold of the dormancy timer is inversely proportional to the resource occupation rate. In this way, relatively longer time threshold of the dormancy timer may be set when a system occupation rate is low, so as to improve user experience; and relatively shorter time threshold of the dormancy timer may be set when the system occupation rate is high, so as to provide a higher capacity and provide services for more user terminals.

29 Claims, 3 Drawing Sheets

(51) Int. Cl.
*H04W 52/02* (2009.01)
*H04W 72/04* (2009.01)

(56) References Cited

U.S. PATENT DOCUMENTS

| | | |
|---|---|---|
| 2002/0172178 A1 | 11/2002 | Suzuki et al. |
| 2003/0236094 A1 | 12/2003 | Jami et al. |
| 2004/0249744 A1 | 12/2004 | Ishikawa et al. |
| 2005/0002394 A1 | 1/2005 | Eisemann et al. |
| 2005/0157723 A1 | 7/2005 | Kim et al. |
| 2006/0221909 A1 | 10/2006 | Farineau et al. |
| 2007/0014254 A1 | 1/2007 | Chung et al. |
| 2008/0014959 A1 | 1/2008 | Karlsson |
| 2008/0198871 A1 | 8/2008 | Shahidi et al. |
| 2012/0282963 A1 | 11/2012 | Xi |

FOREIGN PATENT DOCUMENTS

| | | |
|---|---|---|
| CN | 101073279 | 11/2007 |
| CN | 101132610 | 2/2008 |
| CN | 101599908 | 12/2009 |
| CN | 101617519 A | 12/2009 |
| CN | 101772061 | 7/2010 |
| EP | 1182895 | 2/2002 |
| EP | 1942602 | 7/2008 |
| JP | 2002-135854 | 5/2002 |
| JP | 2003-037874 | 2/2003 |
| WO | 03079659 | 9/2003 |
| WO | 2006057906 | 6/2006 |
| WO | 2009046357 | 4/2009 |
| WO | 2009104086 | 8/2009 |

OTHER PUBLICATIONS

Second Office Action, dated Nov. 1, 2012, in corresponding Chinese Application No. 201010002267.6.

Written Opinion, dated May 119, 2011, in corresponding International Application No. PCT/CN2011/070284.

Search Report, dated Oct. 9, 2012, in corresponding European Application No. 11732677.7.

Lee, Chi-Chen et al., *Impact of Inactivity Time on Energy Consumption in WCDMA and cdma2000*, Department of Computer Science, National Tsing Hua University Hsinchu, Taiwan, 2004, 10 pp.

Yeh, Jui-Hung et al., *Comparative Analysis of Energy-saving Techniques in 3GPP and 3GPP2 Systems*, IEEE Transactions on Vehicular Technology, vol. 58, No. 1, Jan. 2009, 18pp.

International Search Report, dated May 19, 2011, in corresponding International Application No. PCT/CN2011/070284, 3 pp.

Office Action, dated Feb. 17, 2012, in corresponding Chinese Application No. 201010002267.6.

Notice of Allowance, dated Oct. 3, 2014, in corresponding U.S. Appl. No. 13/547,069, 9 pp.

Notice of Reasons for Rejection, dated Feb. 10, 2015, in corresponding Japanese Application No. 2014-089953, 7 pp.

U.S. Appl. No. 13/547,069, filed Jul. 12, 2012, Xi, Huawei Technologies Co., Ltd.

METHOD, USER TERMINAL AND NETWORK SIDE EQUIPMENT FOR IMPROVING NETWORK RESOURCE OCCUPANCY

CROSS REFERENCE TO RELATED APPLICATIONS

This application is a continuation of application Ser. No. 13/547,069, filed on Jul. 12, 2012 which is a continuation of International Patent Application No. PCT/CN2011/070284 filed on Jan. 14, 2011. The International Patent Application claims priority to Chinese Patent Application No. 201010002267.6, filed on Jan. 14, 2010. Both of the aforementioned patent applications are hereby incorporated by reference in their entirety.

TECHNICAL FIELD

The present application relates to the field of communication technologies, and in particular, to a method, a user terminal and a network side equipment for improving network occupancy through a dormancy timer.

BACKGROUND

In a communication network system, to prevent a user terminal, which has no data to transmit, from needlessly occupying a network resource, a mechanism called a "dormancy timer" is introduced. By using this mechanism, whenever a user terminal establishes a connection with a network side equipment, the system establishes a timer for the user terminal, and this timer is called the "dormancy timer". When the user terminal no longer has data to transmit, the dormancy timer starts to count time. If the user terminal has no data to transmit before the dormancy timer expires at a time threshold, the system actively releases the connection with the user terminal and reclaims the occupied resource, thus improving a cyclic utilization rate of limited resources in the system. If the user terminal begins to transmit data before the dormancy timer expires, the dormancy timer is reset and restarted after the user terminal stops to transmit data again.

In the communication network system, if the time threshold of the dormancy timer is set too low, that is, the dormancy timer expires after a short time, although the network resources of the system may be saved, instances of unnecessary removal or establishment of air interface connections may increase, generating an extra load on a signaling processing unit. Frequent removals or establishments of the connections to the user terminal may negatively impact user experience. On the other hand, if the time threshold of the dormancy timer is set too high, limited network resources are unnecessarily occupied by connected user terminals for too long, so that the system cannot reclaim these resources in time. Newly accessing user terminals cannot be allocated with the resources soon enough to establish connections, resulting in a reduced capacity of the system.

SUMMARY

Embodiments of the present invention provide a method, a user terminal and a network side equipment for improving network resource occupancy through controlling a dormancy timer. The technical solutions are described as follows.

In one aspect, a method for improving network resource occupancy in a communication system is provided, which includes: obtaining, by a network side equipment of the communication system, a resource occupation rate of the communication system; determining, by the network side equipment, a time threshold of a dormancy timer according to the obtained resource occupation rate of the communication system; setting, by the network side equipment, the dormancy timer for a user terminal which has a connection with the network side equipment, wherein the dormancy timer starts when the user terminal stops transmitting data and expires when it reaches the time threshold; and when the dormancy timer expires, releasing, by the network side equipment, the connection with the user terminal.

The time threshold of the dormancy timer is inversely proportional to the resource occupation rate.

In another aspect, a network side equipment of a communication system including a receiver, a transmitter, a processor and a memory storing instructions executable by the processor is provided, where the processor is configured to: obtain a resource occupation rate of the communication system; determine a time threshold of a dormancy timer according to the obtained resource occupation rate of the communication system; set the dormancy timer for a user terminal which has a connection with the network side equipment, wherein the dormancy timer starts when the user terminal stops transmitting data and the dormancy timer expires when it reaches the time threshold; and when the dormancy timer expires, release the connection with the user terminal.

The time threshold of the dormancy timer is inversely proportional to the resource occupation rate.

In yet another aspect, a user terminal having a connection with a network side equipment in a communication system is provided, which includes: a receiver, configured to receive from the network side equipment a time threshold reset command with a resource occupation rate of the communication system; and a processor, configured to determine a time threshold of a dormancy timer according to the resource occupation rate of the communication system and release the connection with the network side equipment when the dormancy timer expires.

The dormancy timer starts when the user terminal stops transmitting data and expires when it reaches the time threshold. The time threshold of the dormancy timer is inversely proportional to the resource occupation rate.

In the present invention, the time threshold of the dormancy timer is adjusted dynamically by monitoring the resource occupation rate of the communication system. In one instance, the time threshold of the dormancy timer is inversely proportional to the resource occupation rate. In this way, dormancy time of the user terminals in the communication system may be adjusted flexibly, so that the communication system may provide better services to the user terminals. Unnecessary system overhead may be prevented, and system capacities may be utilized more efficiently.

DETAILED DESCRIPTION OF THE EMBODIMENTS

To make the technical solutions, objectives and merits of the present invention clearer, the embodiments of the present invention are described in detail in the following with reference to the accompanying drawings.

Embodiment 1

Figure 1:
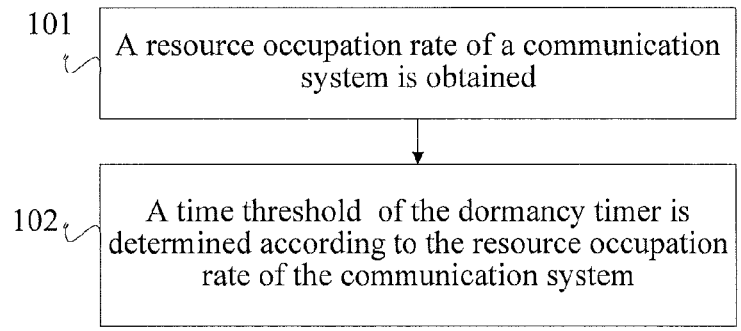
FIG. 1 is a flow chart of a method for improving network resource occupancy according to a first embodiment of the present invention.

Referring to FIG. 1, a method for improving network resource occupancy is provided in a first embodiment of the present invention. The method includes the following:

Step 101: A resource occupation rate of a communication system is obtained.

Step 102: A time threshold of the dormancy timer is determined according to the resource occupation rate of the communication system, where the time threshold of the dormancy timer is inversely proportional to the resource occupation rate.

An adjustment to the time threshold may be performed as following: If the resource occupation rate increases or reaches a first threshold, the time threshold is lowered; and if the resource occupation rate decreases or reaches a second threshold, the time threshold is increased.

In this embodiment, through monitoring the resource occupation rate of the communication system, the time threshold of the dormancy timer is adjusted dynamically according to an inversely proportional relation between the resource occupation rate and the time threshold of the dormancy timer. In this way, dormancy time, which applies to user terminals of the communication system, may be adjusted flexibly, so that the communication system may provide better services. Furthermore, the dormancy timer is adjusted according to the resource occupation rate of the communication system, so that an unnecessary system overhead may be prevented, and system capacity may be improved.

Embodiment 2

Figure 2:
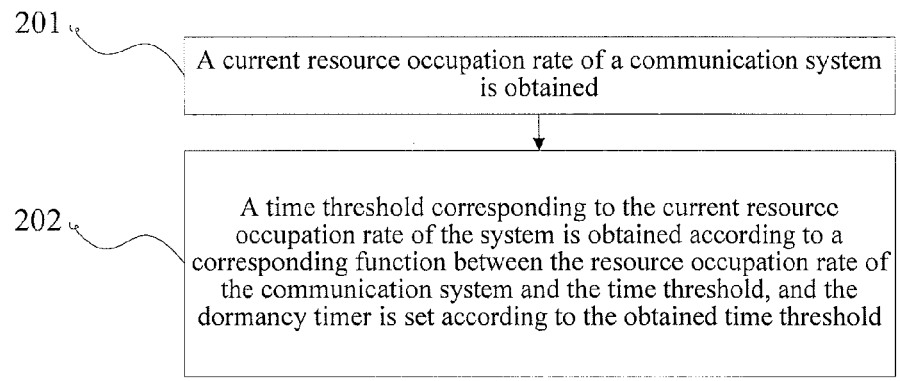
FIG. 2 is a flow chart of a method for improving network resource occupancy according to a second embodiment of the present invention.

Referring to FIG. 2, a method for controlling a dormancy timer is provided in a second embodiment. The method includes:

Step 201: A current resource occupation rate of a communication system is obtained.

Step 202: A time threshold corresponding to the current resource occupation rate of the system is obtained according to a corresponding function between the resource occupation rate of the communication system and the time threshold. The dormancy timer is set according to the obtained time threshold, where the time threshold of the dormancy timer is inversely proportional to the resource occupation rate.

In this way, the time threshold may be adjusted according to the corresponding function, so as to facilitate future maintenance and data updating. For example, during the data updating, the corresponding function may be adjusted accordingly.

Besides the corresponding function, the relation between the resource occupation rate of the communication system and the time threshold may also be set in other manners, for example, in a form of a corresponding relation table. The corresponding function adopted in this embodiment of the present invention is merely taken as an example, and this embodiment of the present invention is not limited herein.

Figure 3:
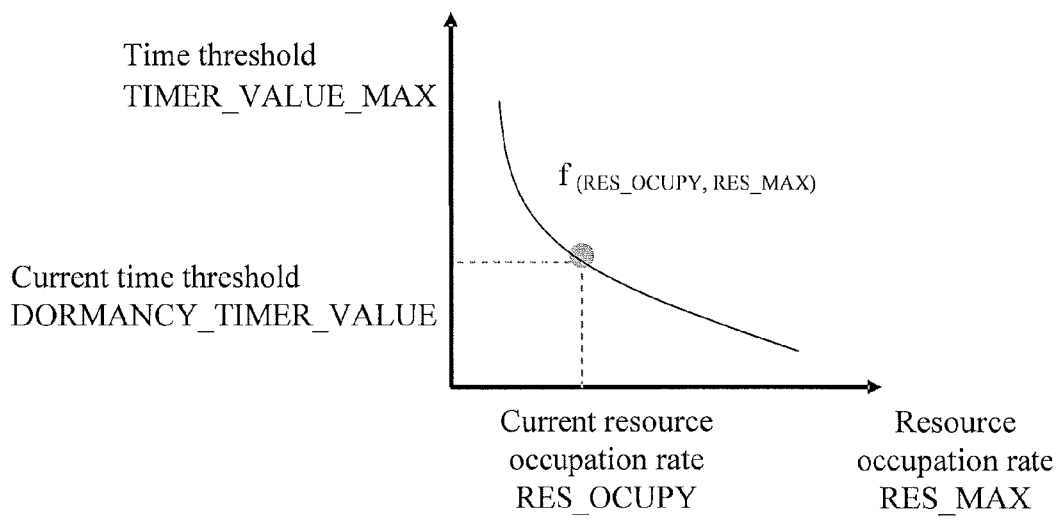
FIG. 3 is a plot of a corresponding function between a resource occupation rate of a communication system and a time threshold of a dormancy timer according to an embodiment of the present invention.

A plot of the corresponding function between the resource occupation rate and the time threshold is shown in FIG. 3. The corresponding function is specifically expressed as:

DORMANCY_TIMER_VALUE=f(RES_OCUPY, RES_MAX),

In the corresponding function, the time threshold is changed with the change of the resource occupation rate. As shown in FIG. 3, the vertical coordinate represents the time threshold, the horizontal coordinate represents the resource occupation rate, where DORMANCY_ TIMER_VALUE is a current value of the time threshold of the dormancy timer, RES_OCUPY is a current value of the resource occupation rate of the system, and RES_MAX is a maximum resource occupation rate of the system.

According to the corresponding function, each value of the time threshold corresponding to each value of the resource occupation rate may be obtained. Through this manner, corresponding time threshold may be calculated rapidly according to the corresponding function, thus saving a system overhead.

Figure 4:
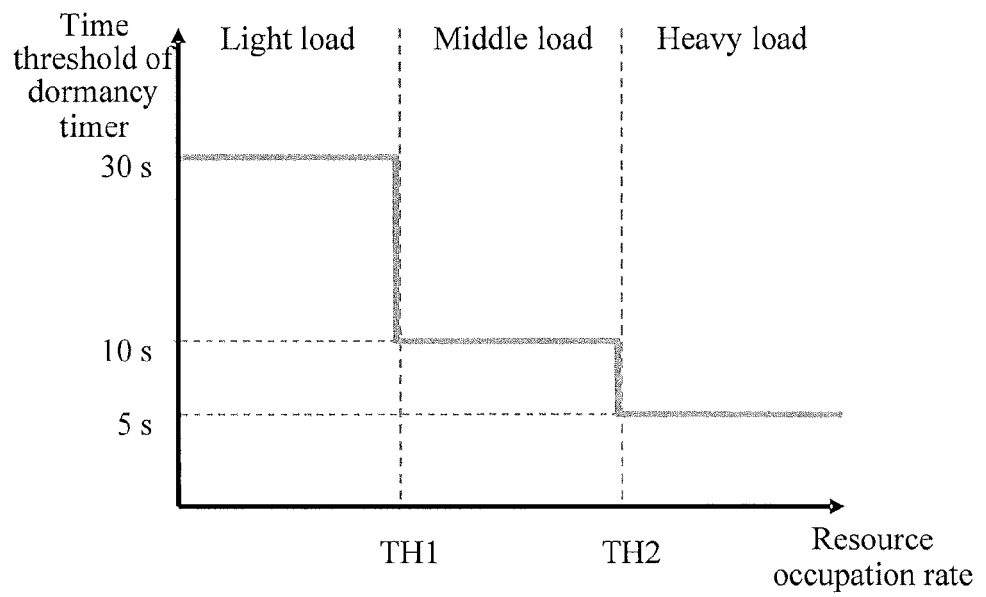
FIG. 4 is a plot of an example of the corresponding function in FIG. 3.
Figure 5:
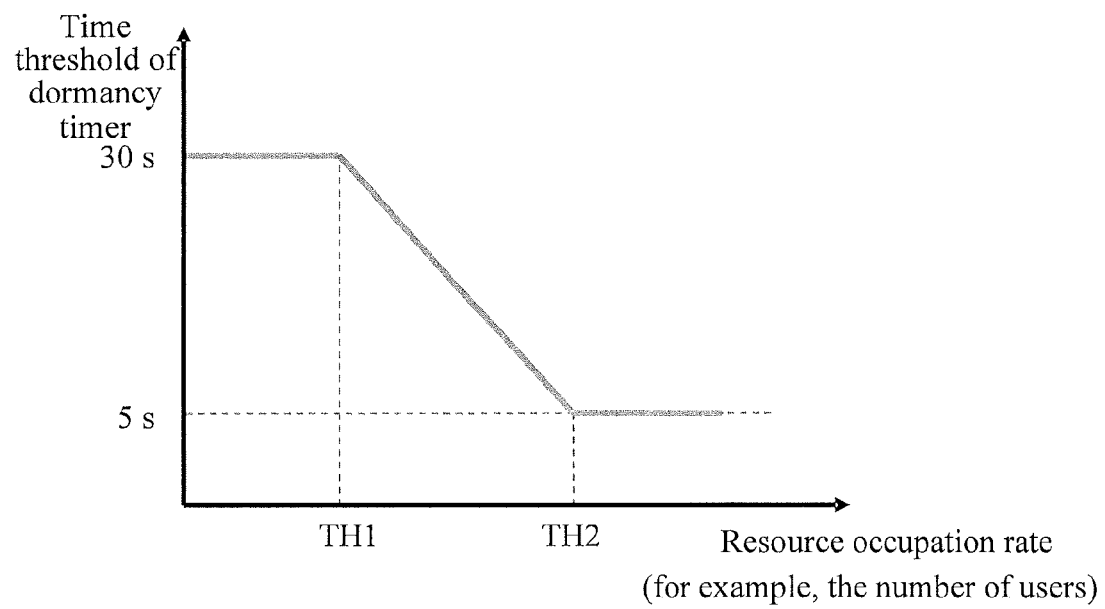
FIG. 5 is a plot of another example of the corresponding function in FIG. 3.

The function shown in FIG. 3 may specifically be embodied as following:

As shown in FIG. 4, the time threshold of the dormancy timer is a constant corresponding to each region of the resource occupation rate. Alternatively, as shown in FIG. 5, the time threshold of the dormancy timer is a constant corresponding to two end regions of the resource occupation rate, and is a variable corresponding to a middle region of the resource occupation rate. The time threshold is decreased as the resource occupation rate increases.

A plot of a corresponding function is shown in FIG. 4. The function may be specifically expressed as:

$$\text{DORMANCY\_TIMER\_VALUE} = \begin{cases} t1 & \text{RES\_OCUPY} < TH1 \\ t2 & TH1 \leq \text{RES\_OCUPY} \leq TH2, \\ t3 & TH2 < \text{RES\_OCUPY} \end{cases}$$

where

TH1 is a first threshold of the resource occupation rate, TH2 is a second threshold of the resource occupation rate, and TH1<TH2<RES_MAX.

The time threshold, expressed in the above formula as the DORMANCY_TIMER_VALUE, has three predetermined values, t1 is a first predetermined value of the time threshold, t2 is a second predetermined value of the time threshold, and t3 is a third predetermined value of the time threshold, and t1>t2>t3.

A value range of the resource occupation rate is separated into three segments by the first threshold and the second threshold. When the resource occupation rate is greater than TH2, which is considered to be in a "heavy" interval of the value range, the dormancy timer of a user terminal of the communication system adopts a smaller value t3 (for example, 5 seconds). When the resource occupation rate is greater than TH1 and smaller than or equals to TH2, which is considered to be in a "middle" interval of the value range, the dormancy timer adopts a little greater value t2 (for example, 10 seconds). When the resource occupation rate is smaller than TH1, which is considered to be in a "light" interval of the value range, the dormancy timer adopts a much greater value t1 (for example, 30 seconds).

By adopting the time threshold in the manner shown above, frequent adjustments to the time threshold may be prevented, thus reducing the system overhead.

Another plot of a corresponding function is shown in FIG. 5. The function may be specifically expressed as:

$$\text{DORMANCY\_TIMER\_VALUE} = \begin{cases} t1 & \text{RES\_OCUPY} < TH1 \\ \text{RES\_OCUPY} / (TH2 - TH1) * t2 - t1 & TH1 \leq \text{RES\_OCUPY} \leq TH2 \\ t3 & TH2 < \text{RES\_OCUPY} \end{cases},$$

where, in the preceding formula, TH1 is a first threshold of the resource occupation rate, TH2 is a second threshold of the resource occupation rate, and TH1<TH2<RES_MAX;

The time threshold, expressed in the above formula as the DORMANCY_TIMER_VALUE, has three predetermined values, t1 is a first predetermined value of the time threshold, t2 is a second predetermined value of the time threshold, t3 is a third predetermined value of the time threshold, and t1>t2>t3.

A value range of the resource occupation rate is separated into three segments by the first threshold and the second threshold. When the resource occupation rate is greater than TH2, which is considered to be in a "heavy" interval of the value range, the dormancy timer of a user terminal of the communication system adopts a smaller value t3 (for example, 5 seconds). When the resource occupation rate is greater than TH1 and smaller or equals to TH2, which is considered to be in a "middle" interval of the value range, the dormancy timer adopts a value that is equal to (RES_OCUPY-TH1)/(TH2-TH1)*25+5. When the resource occupation rate is smaller than TH1, which is considered to be in a "light" interval of the value range, the dormancy timer adopts a greater value t1 (for example, 30 seconds).

By adopting the time threshold in the manner shown above, the time threshold of the system may be controlled more accurately, so as to achieve a more accurate control effect.

The function plots shown in FIG. 4 and FIG. 5 are merely specific implementation manners of the function plot shown in FIG. 3. Which kind of function is adopted may be determined according to specific usage. This embodiment of the present invention is not limited herein.

Embodiment 3

Figure 6:
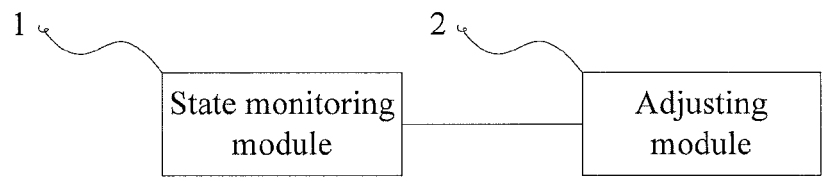
FIG. 6 is a block diagram of an apparatus for improving network resource occupancy according to a third embodiment of the present invention.

Referring to FIG. 6, an apparatus for controlling a dormancy timer provided in a third embodiment of the present invention includes:

a state monitoring module 1, configured to monitor a resource occupation rate of a communication system; and an adjusting module 2, configured to adjust time threshold of the dormancy timer according to the resource occupation rate of the communication system, where the time threshold of the dormancy timer is inversely proportional to the resource occupation rate.

The adjustment of the time threshold may be as following: If the resource occupation rate increases or reaches a threshold, the time threshold is decreased. If the resource occupation rate decreases or decreases to a threshold, the time threshold is increased.

In this embodiment of the present invention, through monitoring the resource occupation rate of the communication system, the dormancy timer is adjusted dynamically according to an inversely proportional relation between the resource occupation rate and the time threshold of the dormancy timer. In this way, dormancy time of the communication system may be adjusted flexibly, so that the communication system may provide better services. Furthermore, the dormancy timer is adjusted according to the resource occupation rate of the communication system, so that an unnecessary system overhead may be prevented, and system capacities may be utilized more efficiently.

Embodiment 4

Figure 7:
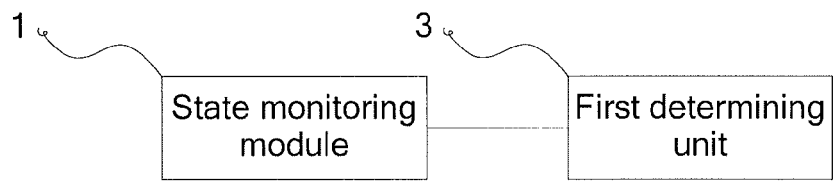
FIG. 7 is a block diagram of an apparatus for improving network resource occupancy according to a fourth embodiment of the present invention.

As shown in FIG. 7, a fourth embodiment of the present invention provides an apparatus for controlling a dormancy timer. That is, the adjusting module 2 in Embodiment 3 may include a first determining unit 3. As shown in FIG. 7, the apparatus includes:

a state monitoring module 1, configured to monitor a resource occupation rate of a communication system.

a first determining unit 3, configured to determine a time threshold corresponding to the resource occupation rate of the system according to a corresponding function between the resource occupation rate of the communication system and the time threshold, where the time threshold of the dormancy timer is inversely proportional to the resource occupation rate.

In this way, the time threshold may be adjusted according to the corresponding function, so as to facilitate a future maintenance and a data updating. For example, during updating, the corresponding function may be adjusted accordingly. The value of the time threshold may be adjusted during the runtime of the system. Besides the function, the relation between the resource occupation rate of the communication system and the time threshold may also be set in other manners, for example, in a form of a corresponding relation table. The corresponding function adopted in this embodiment of the present invention is merely taken as an example, and this embodiment of the present invention is not limited herein.

A plot of the corresponding function between the resource occupation rate and the time threshold may be shown in FIG. 3. The corresponding function is specifically expressed as:
DORMANCY_TIMER_VALUE=f(RES_OCUPY, RES_MAX), In the corresponding function, the time threshold is changed with the change of the resource occupation rate. As shown in FIG. 3, the vertical coordinate represents the time threshold, the horizontal coordinate represents the resource occupation rate, where DORMANCY_TIMER_ VALUE is a current value of the time threshold of the dormancy timer, RES_OCUPY is a current value of the resource occupation rate of the system, and RES_MAX is a maximum resource occupation rate of the system.

According to the corresponding function, each value of the time threshold corresponding to each value of the resource occupation rate may be obtained. Through this manner, corresponding time threshold may be calculated rapidly according to the corresponding function, thus saving a system overhead.

The preceding function may specifically be embodied as following:

As shown in FIG. 4, the time threshold of the dormancy timer is a constant corresponding to each region of the resource occupation rate. Alternatively, as shown in FIG. 5, the time threshold of the dormancy timer is a constant corresponding to two end regions of the resource occupation rate, and is a variable corresponding to a middle region of the resource occupation rate. The time threshold is decreased as the resource occupation rate increases.

A plot of a corresponding function is shown in FIG. 4. The function may be specifically expressed as:

$$DORMANCY\_TIMER\_VALUE = \begin{cases} t1 & RES\_OCUPY < TH1 \\ t2 & TH1 \le RES\_OCUPY \le TH2 \\ t3 & TH2 < RES\_OCUPY \end{cases},$$

where

TH1 is a first threshold of the resource occupation rate, TH2 is a second threshold of the resource occupation rate, and TH1<TH2<RES_MAX;

The time threshold, expressed in the above formula as the DORMANCY_TIMER_VALUE, has three predetermined values, t1 is a first predetermined value of the time threshold, t2 is a second predetermined value of the time threshold, and t3 is a third predetermined value of the time threshold, and t1>t2>t3.

A value range of the resource occupation rate is separated into three segments by the first threshold and the second threshold. When the resource occupation rate is greater than TH2, which is considered to be in a "heavy" interval of the value range, the dormancy timer of a user terminal of the communication system adopts a smaller value t3 (for example, 5 seconds). When the resource occupation rate is greater than TH1 and smaller than or equals to TH2, which is considered to be in a "middle" interval of the value range, the dormancy timer adopts a little greater value t2 (for example, 10 seconds). When the resource occupation rate is smaller than TH1, which is considered to be in a "light" interval of the value range, the dormancy timer adopts a much greater value t1 (for example, 30 seconds).

By adopting the time threshold in the manner shown above, frequent adjustments to the time threshold may be prevented, thus reducing the system overhead.

Another plot of a corresponding function is shown in FIG. 5. The function may be specifically expressed as:

$$DORMANCY\_TIMER\_VALUE = \begin{cases} t1 & RES\_OCUPY < TH1 \\ RES\_OCUPY/ & TH1 \le RES\_OCUPY \le TH2 \\ (TH2-TH1)*t2-t1 & \\ t3 & TH2 < RES\_OCUPY \end{cases},$$

where, in the preceding formula, TH1 is a first threshold of the resource occupation rate, TH2 is a second threshold of the resource occupation rate, and TH1<TH2<RES_MAX;

The time threshold, expressed in the above formula as the DORMANCY_TIMER_VALUE, has three predetermined values, t1 is a first predetermined value of the time threshold, t2 is a second predetermined value of the time threshold, and t3 is a third predetermined value of the time threshold, and t1>t2>t3.

A value range of the resource occupation rate is separated into three segments by the first threshold and the second threshold. When the resource occupation rate is greater than TH2, which is considered to be in a "heavy" interval of the value range, the dormancy timer of a user terminal of the communication system adopts a smaller value t3 (for example, 5 seconds). When the resource occupation rate is greater than TH1 and smaller or equals to TH2, which is considered to be in a "middle" interval of the value range, the dormancy timer adopts a value that is equal to (RES_OCUPY-TH1)/(TH2-TH1)*25+5. When the resource occupation rate is smaller than TH1, which is considered to be in a "light" interval of the value range, the dormancy timer adopts a greater value t1 (for example, 30 seconds).

By adopting the time threshold in the manner shown above, the time threshold of the system may be controlled more accurately, so as to achieve a more accurate control effect.

The function plots shown in FIG. 4 and FIG. 5 are merely specific implementation manners of the function plot shown in FIG. 3. Which kind of function is adopted may be determined according to specific usage. This embodiment of the present invention is not limited herein.

Embodiment 5

Figure 8:
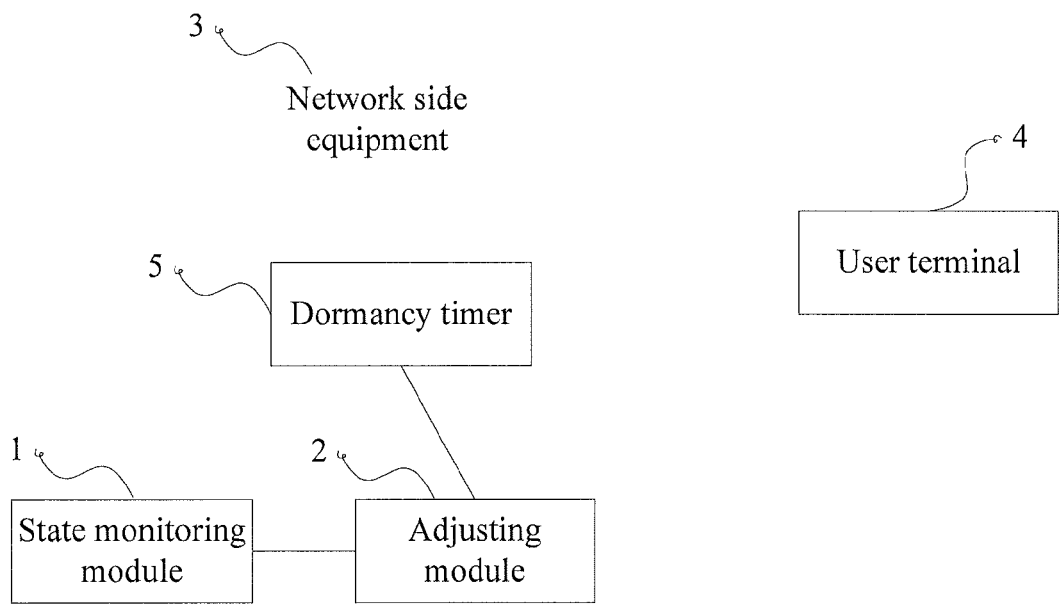
FIG. 8 is a block diagram of a communication system according to a fifth embodiment of the present invention.

Referring to FIG. 8, a communication system provided in a fifth embodiment of the present invention includes a network side equipment 3 and a user terminal 4 (e.g. a mobile terminal). The user terminal 4 is connected to the network side equipment 3 and is configured to perform data transmission. The communication system includes a dormancy timer 5 set at the network side equipment 3 and/or inside the user terminal 4, and specifically includes:

a state monitoring module 1, configured to monitor a resource occupation rate of the communication system; and an adjusting module 2, configured to adjust time threshold of the dormancy timer according to the resource occupation rate of the communication system, where the time threshold of the dormancy timer is inversely proportional to the resource occupation rate.

In this embodiment, through monitoring the resource occupation rate of the communication system, the dormancy timer is adjusted dynamically according to an inversely proportional relation between the resource occupation rate and the time threshold of the dormancy timer. In this way, dormancy time of the communication system may be adjusted flexibly, so that the communication system may provide better services, so that an unnecessary system overhead may be prevented, and decrease of a system capacity may also be prevented.

The dormancy timer 5 may be set at the network side equipment 3 and/or inside the user terminal 4. The state monitoring module 1 and the adjusting module 2 may be independent to the dormancy timer, or may be set inside the dormancy timer.

For the state monitoring module 1 and the adjusting module 2, reference may be made to Embodiment 3 or Embodiment 4.

For each preceding embodiment, the dormancy timer may be set at the network side equipment and/or a user terminal side. In this way, when the dormancy timer reaches the time threshold, the network side equipment may be actively disconnected with the user terminal so as to release occupied resources. The user terminal may also be actively disconnected with the network side equipment so as to release the occupied resources.

The state monitoring module 1 may be set at the network side equipment. In this way, the network side equipment may monitor the resource occupation rate of the communication system. The adjusting module 2 may be set at the network side equipment and/or the user terminal side. Either the network side equipment or the user terminal side may initiate an operation of adjusting the dormancy timer dynamically according to the resource occupation rate of the communication system. The dormancy timer may be set at the network side equipment, or at the user terminal side, or at both the network side equipment and the user terminal side. The dormancy timer may be adjusted by sending a time threshold reset command through the network. The network side equipment may be a base station. It can be seen that, the communication system provided in this embodiment of the present invention includes the state monitoring module 1 and the adjusting module 2, and the two modules may be set separately. For example, the state monitoring module 1 and the adjusting module 2 are set at the network side equipment; or the state monitoring module 1 is set at the network side equipment, and the adjusting module 2 is set at the user terminal side; or the state monitoring module 1 is set at the network side equipment, and the adjusting module 2 is set both at the network side equipment and the user terminal side.

The resource occupation rate may be determined according to the number of accessing user terminals of the system. When the number of accessing user terminals of the system is large, it is considered that the system occupation rate is high. When the number of accessing user terminals of the system is small, it is considered that the system occupation rate is low. Definitely, the resource occupation rate may be calculated in other manners. This embodiment of the present invention is not limited herein.

It can be seen from the preceding embodiments that, in the embodiments of the present invention, the resource occupation rate of the communication system is monitored, so as to facilitate a dynamical adjustment to the dormancy timer. In this way, relatively longer of the dormancy timer may be set when the system occupation rate is low, so as to improve user terminal experience; and relatively shorter time threshold of the dormancy timer may be set when the system occupation rate is high so as to provide a higher capacity and provide services for more user terminals. A preset corresponding relation may be classified into two types: The time threshold is constant in each interval, or the time threshold is changed with the change of the resource occupation rate in an interval or in all intervals. In the first manner, a frequency of the adjustment on the time threshold of the dormancy timer may be reduced, thus reducing the system overhead. In the second manner, the time threshold may be adjusted more accurately according to the resource occupation rate, so as to achieve accurate control. The present invention is applicable to all systems where dormancy timers are applied.

All or a part of content of the technical solutions provided in the preceding embodiments may be implemented by software programming, and a software program may be stored in readable storage media, such as a hard disk, an optical disk, or a floppy disk in a computer.

The preceding descriptions are merely exemplary embodiments of the present invention, but are not intended to limit the scope of the present invention. Any modification, equivalent replacement, or improvement made without departing from the spirit and principle of the present invention shall fall within the protection scope of the present invention.

What is claimed is:

1. A method for improving network resource occupancy in a communication system, comprising:
   obtaining, by a network side equipment of the communication system, a resource occupation rate of the communication system; and
   setting, by the network side equipment, a time threshold of a dormancy timer for a user terminal according to the resource occupation rate, wherein the dormancy timer starts when there is no data transmission between the user terminal and the network side equipment, and expires when it reaches the time threshold, and the time threshold of the dormancy timer decreases as the resource occupation rate increases; and
   when the dormancy timer expires, releasing, by the network side equipment, a connection with the user terminal.

2. The method according to claim 1, wherein the time threshold corresponding to the obtained resource occupation rate is set according to a relation between the resource occupation rate and the time threshold.

3. The method according to claim 2, wherein the relation between the resource occupation rate and the time threshold is:

$$\text{DORMANCY\_TIMER\_VALUE} = \begin{cases} t1 & \text{RES\_OCUPY} < TH1 \\ t2 & TH1 \le \text{RES\_OCUPY} \le TH2 ; \\ t3 & TH2 < \text{RES\_OCUPY} \end{cases}$$

wherein,
DORMANCY_TIMER_VALUE is the time threshold, RES_OCUPY is the resource occupation rate, TH1 is a first threshold of the resource occupation rate, TH2 is a second threshold of the resource occupation rate, and TH1<TH2; and
t1 is a first predetermined value of the time threshold, t2 is a second predetermined value of the time threshold, t3 is a third predetermined value of the time threshold, and t1>t2>t3.

4. The method according to claim 2, wherein the relation between the resource occupation rate and the time threshold is:

$$\text{DORMANCY\_TIMER\_VALUE} = \begin{cases} t1 & \text{RES\_OCUPY} < TH1 \\ \text{RES\_OCUPY}/ & \\ (TH2-TH1)*t2-t1 & TH1 \le \text{RES\_OCUPY} \le TH2 \\ t3 & TH2 < \text{RES\_OCUPY} \end{cases}$$

wherein,
DORMANCY_TIMER_VALUE is the time threshold, RES_OCUPY is the resource occupation rate, TH1 is a first threshold of the resource occupation rate, TH2 is a second threshold of the resource occupation rate, and TH1<TH2; and
t1 is a first predetermined value of the time threshold, t2 is a second predetermined value of the time threshold, t3 is a third predetermined value of the time threshold, and t1>t2>t3.

5. The method according to claim 1, the obtaining the resource occupation rate of the communication system comprises:

determining the resource occupation rate according to a number of accessing user terminals in the communication system.

6. The method according to claim 1, further comprising:
sending, by the network side equipment, a time threshold reset command to the user terminal with the obtained resource occupation rate.

7. The method according to claim 6, further comprising:
releasing, by the user terminal, the connection between the user terminal and the network side equipment when the dormancy timer expires.

8. The method according to claim 1, wherein the dormancy timer for a user terminal is set in at least one of the network side equipment or the user terminal.

9. The method according to claim 1, wherein the time threshold of the dormancy timer continuously decreases as the resource occupation rate increases.

10. A network side equipment of a communication system, comprising a receiver, a transmitter, a processor and a memory storing instructions executable by the processor, wherein the processor is configured to:
obtain a resource occupation rate of the communication system;
set a time threshold of a dormancy timer for a user terminal according to the resource occupation rate, wherein the dormancy timer starts when there is no data transmission between the user terminal and the network side equipment, and expires when it reaches the time threshold, and the time threshold of the dormancy timer decreases as the resource occupation rate increases; and
when the dormancy timer expires, release a connection with the user terminal.

11. The network side equipment according to claim 10, wherein the time threshold corresponding to the obtained resource occupation rate is set according to a relation between the resource occupation rate and the time threshold.

12. The network side equipment according to claim 11, wherein the relation between the resource occupation rate and the time threshold is:

$$DORMANCY\_TIMER\_VALUE = \begin{cases} t1 & RES\_OCUPY < TH1 \\ t2 & TH1 \leq RES\_OCUPY \leq TH2 \\ t3 & TH2 < RES\_OCUPY \end{cases};$$

wherein,
DORMANCY_TIMER_VALUE is the time threshold, RES_OCUPY is the resource occupation rate, TH1 is a first threshold of the resource occupation rate, TH2 is a second threshold of the resource occupation rate, and TH1<TH2; and
t1 is a first predetermined value of the time threshold, t2 is a second predetermined value of the time threshold, t3 is a third predetermined value of the time threshold, and t1>t2>t3.

13. The network side equipment according to claim 11, wherein the relation between the resource occupation rate and the time threshold is:

$$DORMANCY\_TIMER\_VALUE = \begin{cases} t1 & RES\_OCUPY < TH1 \\ RES\_OCUPY/ \\ (TH2-TH1)*t2-t1 & TH1 \leq RES\_OCUPY \leq TH2 \\ t3 & TH2 < RES\_OCUPY \end{cases},$$

wherein,
DORMANCY_TIMER_VALUE is the time threshold, RES_OCUPY is the resource occupation rate, TH1 is a first threshold of the resource occupation rate, TH2 is a second threshold of the resource occupation rate, and TH1<TH2; and
t1 is a first predetermined value of the time threshold, t2 is a second predetermined value of the time threshold, t3 is a third predetermined value of the time threshold, and t1>t2>t3.

14. The network side equipment according to claim 10, wherein the processor is configured to determine the resource occupation rate according to a number of accessing user terminals in the communication system.

15. The network side equipment according to claim 10, wherein the transmitter is configured to send a time threshold reset command to the user terminal which comprises the obtained resource occupation rate.

16. The network side equipment according to claim 10, wherein the network side equipment is a base station.

17. The network side equipment according to claim 10, wherein the time threshold of the dormancy timer continuously decreases as the resource occupation rate increases.

18. A user terminal in communication with a network side equipment in a communication system, comprising:
a receiver, configured to receive from the network side equipment a time threshold reset command; and
a processor, configured to set a time threshold of a dormancy timer according to the time threshold reset command and release a connection with the network side equipment when the dormancy timer expires;
wherein the dormancy timer starts when there is no data transmission between the user terminal and the network side equipment, and expires when it reaches the time threshold; and
wherein the time threshold of the dormancy timer corresponds to a resource occupation rate of the communication system and decreases as the resource occupation rate increases.

19. The user terminal according to claim 18, wherein the dormancy timer is reset when the user terminal begins data transmission.

20. The user terminal according to claim 18, wherein the time threshold corresponding to the resource occupation rate is set according to a relation between the resource occupation rate and the time threshold.

21. The user terminal according to claim 20, wherein the relation between the resource occupation rate and the time threshold is:

$$DORMANCY\_TIMER\_VALUE = \begin{cases} t1 & RES\_OCUPY < TH1 \\ t2 & TH1 \leq RES\_OCUPY \leq TH2 \\ t3 & TH2 < RES\_OCUPY \end{cases};$$

wherein,
DORMANCY_TIMER_VALUE is the time threshold, RES_OCUPY is the resource occupation rate, TH1 is a first threshold of the resource occupation rate, TH2 is a second threshold of the resource occupation rate, and TH1<TH2; and t1 is a first predetermined value of the time threshold, t2 is a second predetermined value of the time threshold, t3 is a third predetermined value of the time threshold, and t1>t2>t3.

22. The user terminal according to claim 20, wherein the relation between the resource occupation rate and the time threshold is:

$$DORMANCY\_TIMER\_VALUE = \begin{cases} t1 & RES\_OCUPY < TH1 \\ RES\_OCUPY/(TH2-TH1)*t2-t1 & TH1 \le RES\_OCUPY \le TH2 \\ t3 & TH2 < RES\_OCUPY \end{cases},$$

wherein,
DORMANCY_TIMER_VALUE is the time threshold, RES_OCUPY is the resource occupation rate, TH1 is a first threshold of the resource occupation rate, TH2 is a second threshold of the resource occupation rate, and TH1<TH2; and t1 is a first predetermined value of the time threshold, t2 is a second predetermined value of the time threshold, t3 is a third predetermined value of the time threshold, and t1>t2>t3.

23. The user terminal according to claim 18, wherein the user terminal is a mobile terminal in communication with a wireless communication network.

24. The user terminal according to claim 18, wherein the time threshold of the dormancy timer continuously decreases as the resource occupation rate increases.

25. A system for improving network resource occupancy in a communication system, comprising:
a network side equipment; and
a user terminal, wherein
the network side equipment is configured to obtain a resource occupation rate of the communication system, and send a time threshold reset command to the user terminal according to the resource occupation rate; and
the user terminal is configured to receive the time threshold reset command from the network side equipment, set a time threshold of a dormancy timer for the user terminal according to the time threshold reset command, and release a connection with the network side equipment when the dormancy timer expires; and wherein the dormancy timer starts when there is no data transmission between the user terminal and the network side equipment, and expires when it reaches the time threshold, and the time threshold of the dormancy timer decreases as the resource occupation rate increases.

26. The system according to claim 25, wherein the time threshold has a relation with the resource occupation rate.

27. The system according to claim 26, wherein the relation between the resource occupation rate and the time threshold is:

$$DORMANCY\_TIMER\_VALUE = \begin{cases} t1 & RES\_OCUPY < TH1 \\ t2 & TH1 \le RES\_OCUPY \le TH2 \\ t3 & TH2 < RES\_OCUPY \end{cases};$$

wherein,
DORMANCY_TIMER_VALUE is the time threshold, RES_OCUPY is the resource occupation rate, TH1 is a first threshold of the resource occupation rate, TH2 is a second threshold of the resource occupation rate, and TH1<TH2; and t1 is a first predetermined value of the time threshold, t2 is a second predetermined value of the time threshold, t3 is a third predetermined value of the time threshold, and t1>t2>t3.

28. The system according to claim 26, wherein the relation between the resource occupation rate and the time threshold is:

$$DORMANCY\_TIMER\_VALUE = \begin{cases} t1 & RES\_OCUPY < TH1 \\ RES\_OCUPY/(TH2-TH1)*t2-t1 & TH1 \le RES\_OCUPY \le TH2 \\ t3 & TH2 < RES\_OCUPY \end{cases}$$

wherein,
DORMANCY_TIMER_VALUE is the time threshold, RES_OCUPY is the resource occupation rate, TH1 is a first threshold of the resource occupation rate, TH2 is a second threshold of the resource occupation rate, and TH1<TH2; and t1 is a first predetermined value of the time threshold, t2 is a second predetermined value of the time threshold, t3 is a third predetermined value of the time threshold, and t1>t2>t3.

29. The system according to claim 25, wherein the time threshold of the dormancy timer continuously decreases as the resource occupation rate increases.

* * * * *